July 26, 1932.  H. HAYES  1,868,900

CHAMFER SLOTTING PIPE

Filed Aug. 24, 1929

HARRY HAYES
INVENTOR

ATTORNEY

Patented July 26, 1932

1,868,900

UNITED STATES PATENT OFFICE

HARRY HAYES, OF LOS ANGELES, CALIFORNIA, ASSIGNOR TO GENERAL PETROLEUM CORPORATION OF CALIFORNIA, A CORPORATION OF DELAWARE

CHAMFER SLOTTING PIPE

Application filed August 24, 1929. Serial No. 388,187.

My invention pertains to the art of manufacturing slotted pipe and specifically to the product known as screen pipe, used for keeping sand out of oil wells.

The object of my invention is to produce screen pipe having any number of slots, of any desired width and having any angle of slot wall, in a more expeditious and cheaper manner than has heretofore been possible.

The slotting of pipe or casing to fit it for use in straining sand out of the oil which flows into a producing well is well known and understood. It is also well known that in many, if not most, cases it is desirable to form the slot with the walls on an inwardly expanding angle rather than parallel. As the oil flows from the outside to the inside of the casing, a slot having greater width inside than outside will choke much less readily and consequently may be kept in operation for a longer time without cleaning the slots.

Heretofore the very narrow slots used for this purpose, which may for instance be $\frac{1}{10}$ inch in width and say 2 inches long, have been formed either by milling the slots by means of a tool operating inside the pipe, or by an outside tool making two cuts at an angle, or by a means such as a flame cutting tool also making two cuts. Both of these methods are unduly expensive and have serious disadvantages.

I have discovered that I can form in a finished pipe a longitudinal slot having parallel walls and can then bring the upper or outer edges of these walls closer together so that to produce a slot which is wider on the inner circumference than it is on the outer circumference of the pipe.

The slots themselves may be formed by means of a rotating saw or milling tool producing a slot having parallel walls. I prefer, however, to produce them by means of a die held within the pipe and a punch operating in spaced relation in said die on the outside of the pipe, the punch being given a slight longitudinal rake and preferably having a slightly rounded corner. By making both the die and the punch of the toughest steel available I am enabled to punch a considerable number of holes, even where the width is so little as $\frac{1}{10}$ inch and the pipe wall $\frac{1}{4}$ inch or more in thickness, with a single punch. The main requisite is to secure perfect alignment between the punch and the die and to force the punch downward through a guide by which any possibility of side play is eliminated.

Figure 1:
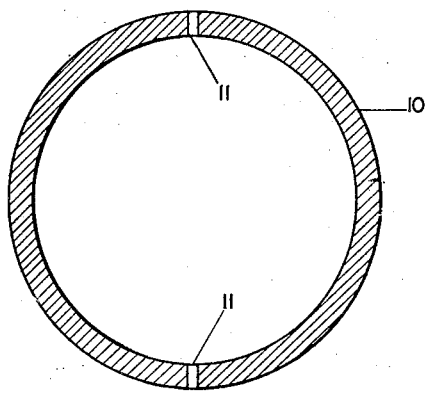

My invention lies, however, not in the manner of forming the slots, as these can be formed in any convenient or preferred manner, but in the conversion of a slot having parallel walls into a slot having a greater width on the inner circumference of the pipe than on its outer circumference. This result may be accomplished by applying pressure to the outer edge of the slot in the manner indicated in the attached drawing, in which, Fig. 1 indicates in cross section a pipe 10 in which slots 11 having parallel side walls have been formed.

Figure 4:
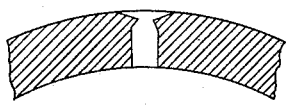
Figure 2:
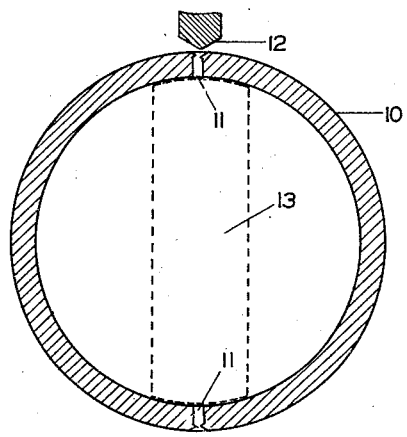

In Fig. 2 these slots have been partially closed at their outer edge by means of the fulling tool of which only the nose is indicated at 12. This tool, when driven or pressed forcibly against the outer edge of the slot while the pipe is supported by means of a flat mandrel as indicated at 13, forms a slight depression surrounding the slot and at the same time swages the metal inward, the shape of the finished slot being indicated on an enlarged scale in Fig. 4.

Figure 3:
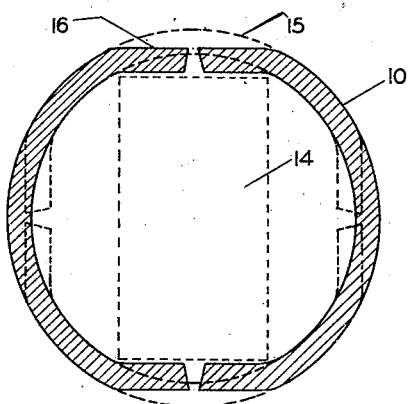

Fig. 3 indicates another method by which the slot having parallel walls may be converted into a slot having converging walls. Where this method is used it is desirable to place the slots opposite each other, any desired number of such pairs of slots being used. The slotted portion of the pipe being placed between a pair of squeeze jaws, a block of the shape indicated at 14 is placed within the pipe and pressure applied by closing the jaws, collapsing the pipe from its original position as indicated at 15 to the position shown at 16. By this means the outer edges of the slot are approached somewhat more closely toward each other while the inner edges are slightly withdrawn from each other and a perfectly regular convergence of the walls of the slot may thus be produced. This method has the advantage over the method indicated in Figs. 2 and 4 that the walls of the finished slot are smooth and regular, while it has the disadvantage that the finished slotted pipe is flattened wherever a slot occurs.

I claim as my invention:

1. The method of making chamfer-slotted pipe which comprises: forming in said pipe, while maintaining the pipe in rounded form, a slot having substantially parallel walls, thereafter applying pressure to that area of the pipe in which the slot is formed, until both the inner and outer walls of the said pipe in the region of the slot become substantially flat with consequent narrowing of the outer edges only of the said formed slot.

2. The method of making chamfer-slotted pipe which comprises: punching in the wall of said pipe, while maintaining it in rounded condition, a narrow slot substantially parallel to the longer axis of the pipe, thereafter squeezing that area of the pipe in which the slot is punched until both the inner and outer walls of the said pipe become substantially flat in the vicinity of the slot with consequent narrowing of the outer edges only of the said punched slot.

3. The method of making chamfer-slotted pipe suitable for use as oil well screen casing which comprises: forming in a pipe while maintaining the roundness thereof, a plurality of lines of substantially parallel walled slots substantially parallel to the longitudinal axis of the pipe; inserting in the pipe a squeeze block having a plurality of flat sides, squeezing the areas of the pipe containing the slots into parallelism as to plane with the flat sides of the squeeze block and then withdrawing said block.

In witness that I claim the foregoing I have hereunto subscribed my name this 19th day of August, 1929.

HARRY HAYES.